United States Patent [19]

Aosaki et al.

[11] Patent Number: 5,452,032
[45] Date of Patent: Sep. 19, 1995

[54] OVERHEAD PROJECTOR

[75] Inventors: Ko Aosaki, Kanagawa; Yanggyun Oh, Nagano, both of Japan

[73] Assignee: Fuji Photo Film Co., Ltd., Kanagawa, Japan

[21] Appl. No.: 325,507

[22] Filed: Oct. 19, 1994

[30] Foreign Application Priority Data

Oct. 19, 1993 [JP] Japan .................. 5-260994

[51] Int. Cl.6 ............................................. G03B 21/00
[52] U.S. Cl. .................... 353/119; 353/DIG. 4; 353/63
[58] Field of Search ............. 353/119, 63, 65, DIG. 3, 353/DIG. 4, DIG. 6

[56] References Cited

U.S. PATENT DOCUMENTS

| | | | |
|---|---|---|---|
| 4,588,271 | 5/1986 | Emura | 353/119 |
| 4,776,688 | 10/1988 | Ushiro et al. | 353/119 |
| 4,938,587 | 7/1990 | Namioka et al. | 353/119 |
| 4,978,218 | 12/1990 | Carpenter et al. | 353/DIG. 4 |
| 5,317,350 | 5/1994 | Nomura et al. | 353/63 |
| 5,345,282 | 9/1994 | Ushiro et al. | 353/119 |

*Primary Examiner*—William A. Cuchlinski, Jr.
*Assistant Examiner*—William C. Dowling
*Attorney, Agent, or Firm*—Young & Thompson

[57] ABSTRACT

An overhead projector a base table, which has a stage on which an original is placed. A projecting head includes projecting mirror and lens, and forms an image of the original. A stand has bottom and top ends. The bottom end is mounted on the base table. The stand swings between an erected position and a folded position where the stand is superposed on the stage. The projecting head is mounted on the top end in swingable fashion. An extension coil spring is disposed between the stand and the base table, biases the stand from the folded position to the erected position, and has biasing force decreasing according as the stand comes nearer to the erected position. A gas spring is disposed between the stand and the base table, biases the stand from the folded position to the erected position, and has biasing force increasing according as the stand comes nearer to the erected position.

17 Claims, 8 Drawing Sheets

OVERHEAD PROJECTOR

BACKGROUND OF THE INVENTION

1. Field of the Invention

The present invention relates to a foldable optical apparatus, for example an overhead projector, and more particularly relates to an optical apparatus of improved portability.

2. Description Related to the Prior Art

There is a known optical apparatus such as an overhead projector, which is either of a reflection type or a transmission type. Such an overhead projector has a stage. A projecting head is held above the stage and substantially parallel to it, and includes an optical system. On the stage, there is placed an original material, namely a transparency on which an opaque image is written or drawn to be projected.

In a reflection type, the stage is constituted by a Fresnel mirror consisting of a Fresnel plate and a reflective layer formed thereon. A light source is included in the projecting head. To project the image on a screen remote from the apparatus, light emitted by the light source is directed to the Fresnel mirror. Transmitted through the original material, the light is reflected upward by the Fresnel mirror to illuminate the original material from below. The light of the image of the original material passes through the optical system inclusive of a projector lens and a projector mirror, and proceeds to the screen.

In a transmission type of overhead projector, a stage is constituted by a Fresnel lens. A light source is contained under the stage. To project the image, light emitted by the light source is passed through the Fresnel lens, and through the original material. The light of the image of the original material passes through an optical system in the projecting head, and proceeds to the screen.

As is suggested in U.S. Pat. No. 5,317,350, the overhead projector, in general, has a base table having the stage, on which a support or a stand is mounted in swingable fashion for the purpose of portability. On a distal end of the stand, a projecting head is mounted. To collapse the overhead projector, the stand and the projecting head are folded to lie on the base table. It would be conceivable to construct an overhead projector in which a projecting head would be supported swingably on a stand, and in which the projecting head could be set up over a stage in response to erection of the stand.

The projecting head on the top of the stand has somewhat great weight. To swing the projecting head in association with the erection of the stand, sufficiently great force must be applied to the stand in the erecting direction. In view of reducing such an erecting force, it is known to associate a spring or other bias devices with the stand, for biasing the stand in the erecting direction.

Only a single spring is used for biasing the stand in an erecting direction. It follows that the biasing force received by stand from the spring is changed remarkably within the range of swing of the stand. The biasing force could be set to increase in the erecting direction, for facility in positioning the stand in the erected position. However, the stand to be erected would require manual application of excessively great force in an initial step of the erection. The upwardly increasing biasing force would cause a difficulty in initially unfolding the stand. Otherwise biasing force of a different spring could be set to decrease in the erecting direction, for retaining the stand folded with ease. However, the stand during erection would require excessively great force in a final step of the erection.

SUMMARY OF THE INVENTION

In view of the foregoing problems, an object of the present invention is to provide a foldable optical apparatus which can be unfolded with great ease.

In order to achieve the above and other objects and advantages of this invention, a foldable optical apparatus includes a base table, which has a stage on which an original is placed. An image forming head includes at least an optical system, and forms an image of the original placed on the base table. A support device has first and second ends, of which the first end is mounted on the base table, and swings between an erected position and a folded position where the support device is superposed on the stage. The image forming head is mounted on the second end in swingable fashion. A first bias device is disposed between the support device and the base table, biases the support device from the folded position to the erected position, and has biasing force decreasing according as the support device comes nearer to the erected position. A second bias device is disposed between the support device and the base table, biases the support device from the folded position to the erected position, and has biasing force increasing according as the support device comes nearer to the erected position.

The optical apparatus of the present invention can be unfolded with great ease, as the biasing force received by stand from the bias devices has no great change within the range of swing of the stand.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
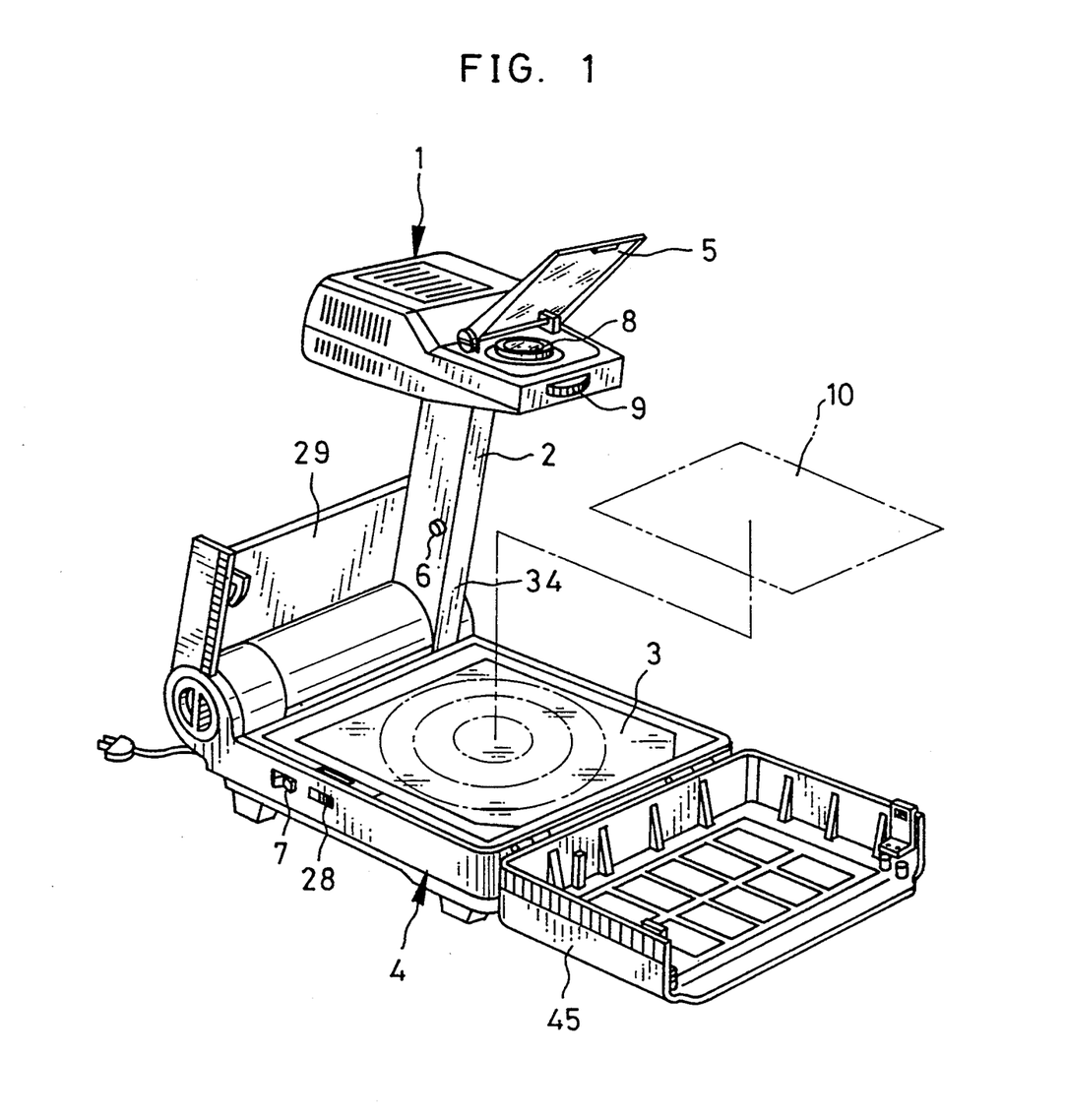
FIG. 1 is a perspective view illustrating a reflection type of an overhead projector in according to the present invention.

FIG. 1 illustrates a collapsible overhead projector of a reflection type in accordance with the present invention. A top of a base table 4 consists of a stage 3, for which a Fresnel mirror is used, and on which an transparent original 10 with an image recorded is placed. The base table 4 has a support device or stand 2 supported in swingable and foldable fashion, and has a distal end on which a projecting head 1 is supported in swingable fashion. The projecting head 1 incorporates a projecting lens 8 and a focus adjusting dial 9. A projecting mirror 5 is mounted on the top of the projecting head 1 in swingable fashion. A main switch 7 is turned on to actuate a light source contained in the projecting head 1, for applying illumination to the stage 3. The illumination is passed through the original 10, is reflected on the stage 3, comes incident on the projecting lens 8, and is reflected by the mirror 5 for projection on a screen.

The projecting head 1 is swung at the same time as the stand 2 and in reverse to the direction of swinging the stand 2. When the stand 2 swings down from the depicted erected position in the clockwise direction, the projecting head 1 swings counterclockwise. When the stand 2 is lowered on to the stage 3 in the folded position, the projecting head 1 is laid on the stage 3 and upside down. On the other hand, when the stand 2 swings up from the folded position, the projecting head 1 swings clockwise. When the stand 2 is fully raised to the erected position, the projecting head 1 comes to its erected position as depicted. Referenced by 29 is a rear cover, which is set in the position as depicted when the overhead projector is in use.

Figure 2:
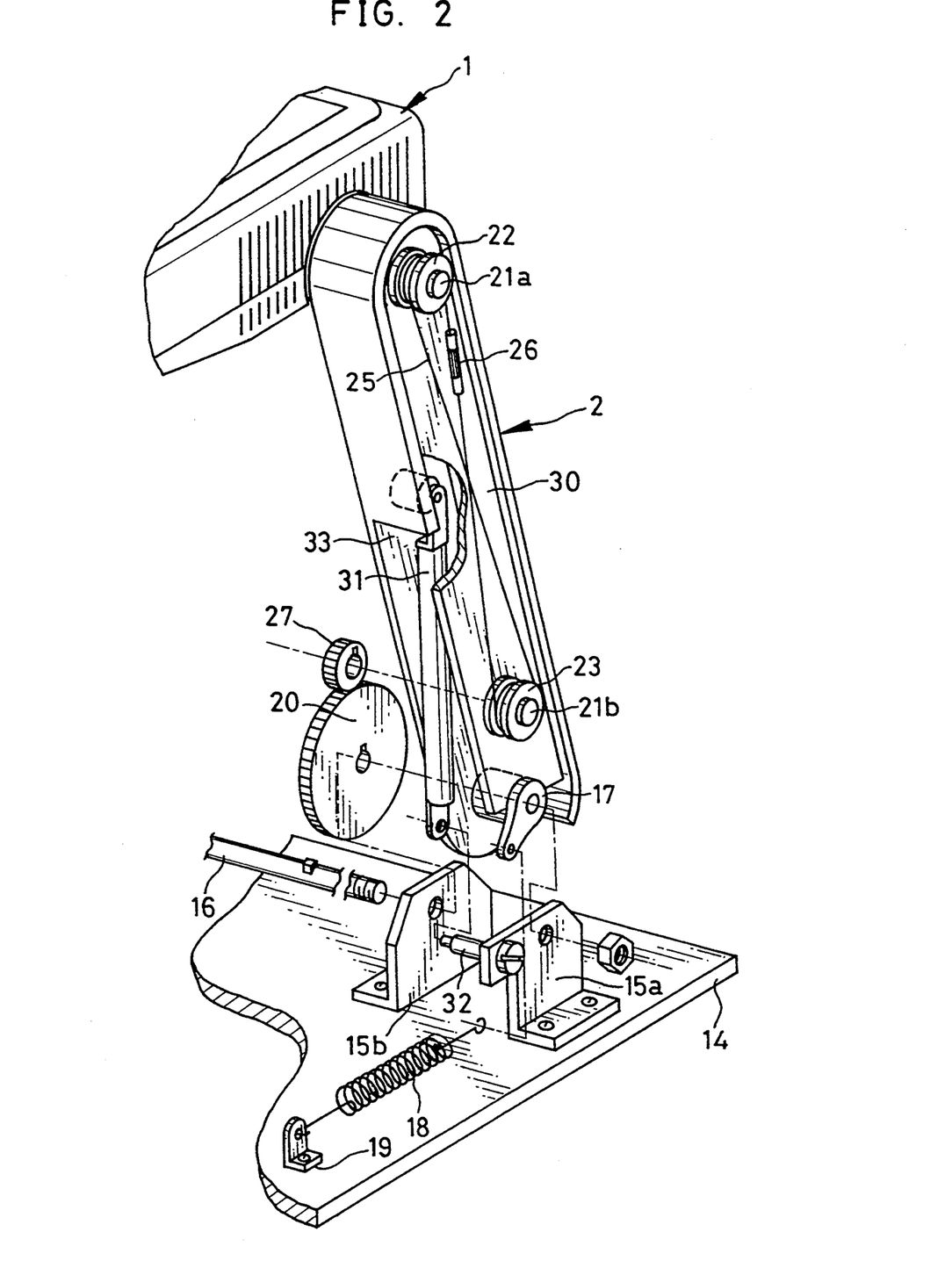
FIG. 2 is an exploded perspective view illustrating a mechanism linking a stand and a projecting head in the overhead projector in FIG. 1.

FIG. 2 illustrates a mechanism for linking the projecting head 1 and the stand 2. A base plate 14 is unified on the base table 4, and has brackets 15a and 15b fixed thereon. A shaft 16 is inserted in the brackets 15a and 15b in rotationally fixed fashion, and supports the stand 2 in swingable fashion. It is to be noted that one of two lateral covers of the stand 2 is eliminated from the drawing for the purpose of the clarification.

A boss 17 is formed integrally with the bottom of the stand 2, and receives a shaft 16. The stand 2 is rotatable about the shaft 16. A gear 20 is fitted on the shaft 16 in rotationally fixed fashion. A distal end of the boss 17 is engaged with one end of an extension coil spring 18, which has a second end engaged with a holding member 19 fixed on a base plate 14. Two pulley shafts 21a and 21b are inserted through the stand 2 in rotatable fashion. Pulleys 22 and 23 are respectively fixed on the pulley shafts 21a and 21b. A wire 25 is connected about the pulleys 22 and 23 in crossed fashion, so that the pulley 22 is rotated in reverse to the pulley 23. Referenced by 26 is a threaded adjusting mechanism for tightening the wire 25.

A pinion 27 is fixed on the pulley shaft 21b, is in mesh with the gear 20, and has teeth at most half as many as teeth formed around the gear 20. When the pinion 27 rotates, the pulley shaft 21b and the pulley 23 are rotated together. The other pulley shaft 21a is fixed on the projecting head 1. When the pulley 22 is rotated, the projecting head 1 is swung via the pulley shaft 21a in the same direction.

The stand 2 contains a partition 30, beside which a gas spring or air spring 31 is incorporated. One end of the gas spring 31 is fitted on the inside of the stand 2. A second end of the gas spring 31 is fitted on a pin 32 projected through the bracket 15a. The gas spring 31, as known in the art, is constituted by a cylinder filled with gas and a piston mounted in the cylinder in slidable fashion. The gas spring 31 is compressed and shortened in receiving resistance, has a characteristic of recovering a originally longer shape, and biases the stand 2 in the erecting direction, so as to prevent the stand 2 from abruptly falling down to the stage 3 even with the somewhat weight of the projecting head 1. Note that the gas spring 31 is swung about the pin 32 by the swing of the stand 2, and can be projected from a cutout 33 in the stand 2 in partial fashion. However the gas spring 31 is kept from appearing externally by a front wall 34. Note that the wall 34 is eliminated from FIGS. 2 and 6A to 6C for convenience in understanding.

Figure 3:
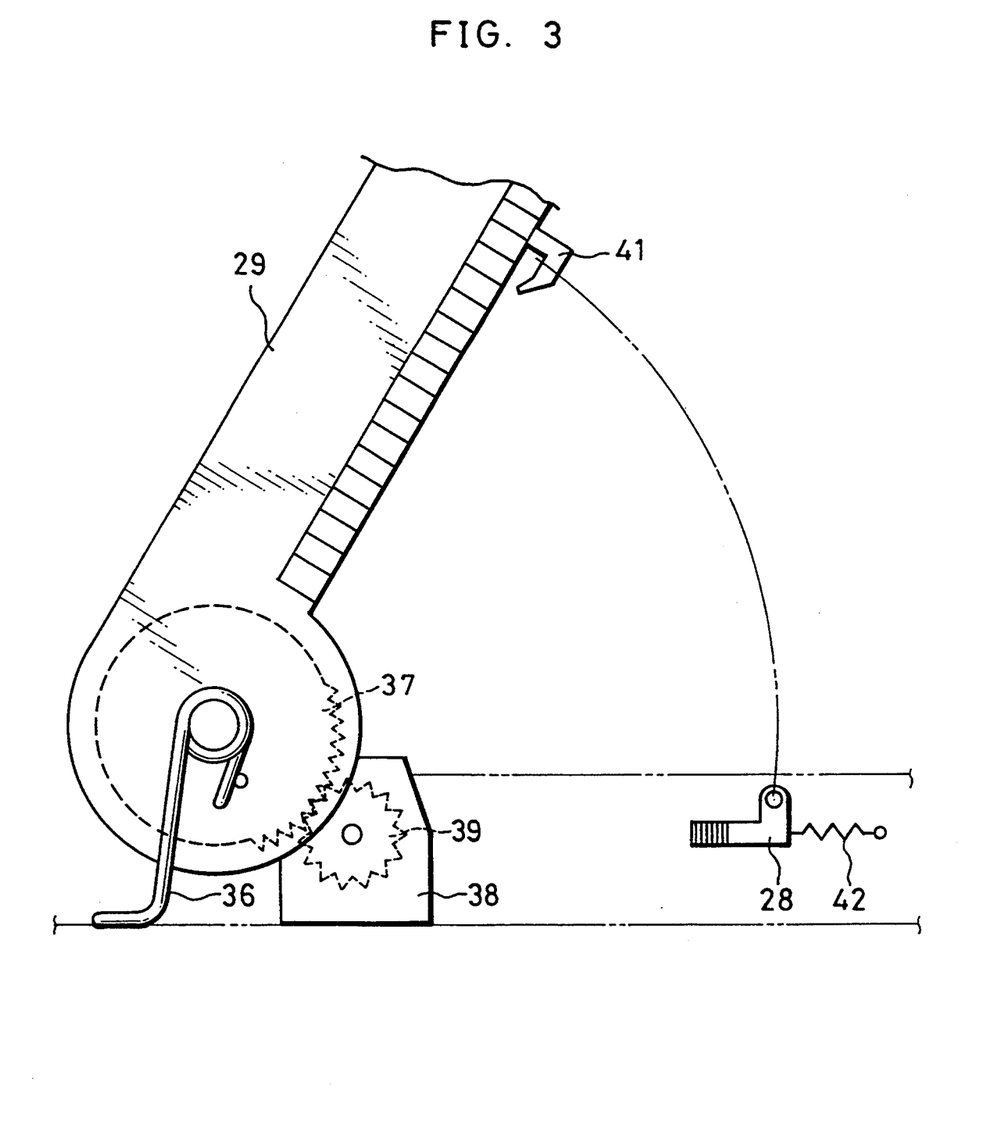
FIG. 3 is an explanatory view illustrating a rear cover to be popped up and a relevant mechanism for swinging it.

FIG. 3 illustrates a structure for erecting the rear cover 29 of the overhead projector. The rear cover 29 is biased upward by a torsion coil spring as pop-up spring 36. An arm governing wheel 37 is fixed on the bottom of the rear cover 29. The arm governing wheel 37 is in mesh with a governor gear 39 included in a governor mechanism 38, which prevents the rear cover 29 from swinging abruptly under the bias of the pop-up spring 36.

The rear cover 29 has a retaining hook 41 directed downward. When the rear cover 29 is closed on the base table 4, the retaining hook 41 is engaged with an opener button 28 biased in a direction toward the retaining hook 41 for the engagement. The retaining hook 41 thus retains the rear cover 29 in its closed position against the bias of the pop-up spring 36.

Figure 4:
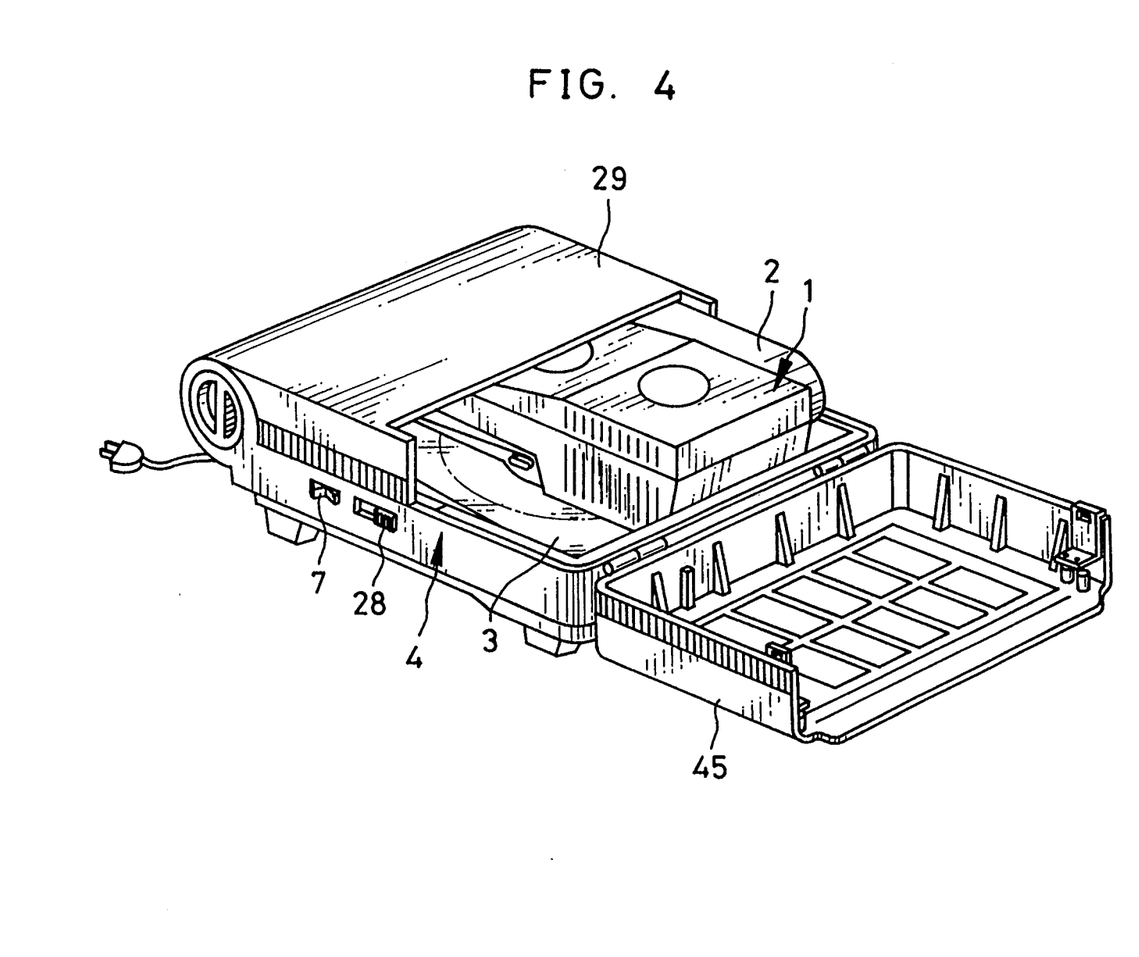
FIG. 4 is a perspective view illustrating the overhead projector, in which the stand and the rear cover are folded.

FIG. 4 illustrates the overhead projector as collapsed. The stand 2 and the projecting head 1 are folded to lie on the stage 3. When a front cover 45 is swung to the projecting head 1 to cover the whole projector, the overhead projector is fully collapsed to be convenient in portability. The rear cover 29 is swingable, and biased by the pop-up spring 36 in FIG. 3 toward the erected position. When the opener button 28 is operated, the retaining hook 41 is disengaged therefrom, and causes the rear cover 29 in the erecting direction.

Figure 5:
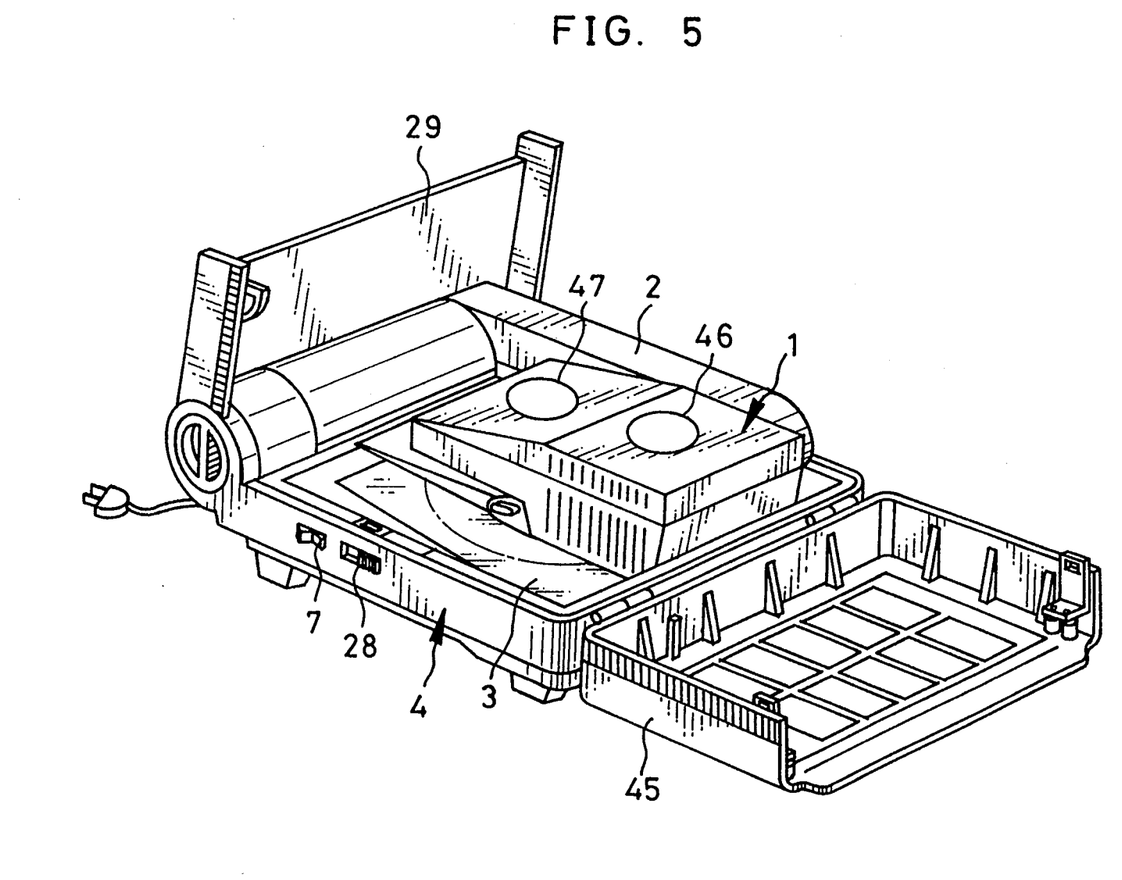
FIG. 5 is a perspective view illustrating the overhead projector, in which the rear cover is swung up.

In FIG. 5, the rear cover 29 is erected. The rear cover 29 is popped up by the bias of the pop-up spring 36 in the erecting direction, and comes to an erected position where the projecting head 1, while moving on the stand 2 is prevented reliably from contacting the rear cover 29. The projecting head 1 has an illuminating opening 46 for illuminating the original 10 and a receiving opening 47 for receiving light from the original 10. The projecting head 1 has an orientation reverse to a standby orientation for the projection, in such form that the illuminating opening 46 and the receiving opening 47 are directed upward. While the rear cover 29 is erected, the rear cover 29 also operates for preventing a user located behind the overhead projector from being dazzled by the light from the stage 3 in course of the projecting operation.

The operation of the above construction is described. When the overhead projector is collapsed completely, the stand 2 is lowered in substantially horizontal orientation. The projecting head 1 is laid upside down on the stage 3, and covered fully in the front cover 45. When the stand 2 is folded in the folded position in FIG. 3, a linking mechanism (not shown) lowers the stage 3, to define a space for containing the projecting head 1.

To use the overhead projector, the front cover 45 is opened at first as in FIG. 4. The opener button 28 is operated against the bias of the spring 42, to disengage the retaining hook 41 from the opener button 28. The spring 36 causes the rear cover 29 to swing up. The arm governing wheel 37 on the rear cover 29 is in mesh with the governor gear 39, and coupled with the governor mechanism 38. It prevents the rear cover 29 from rising abruptly to damage the overhead projector. Note that the governor mechanism 38 is constructed, as well known in the art, in hydraulic fashion or the like, for controlling or regulating speed of a mechanism linked therewith.

Figure 7:
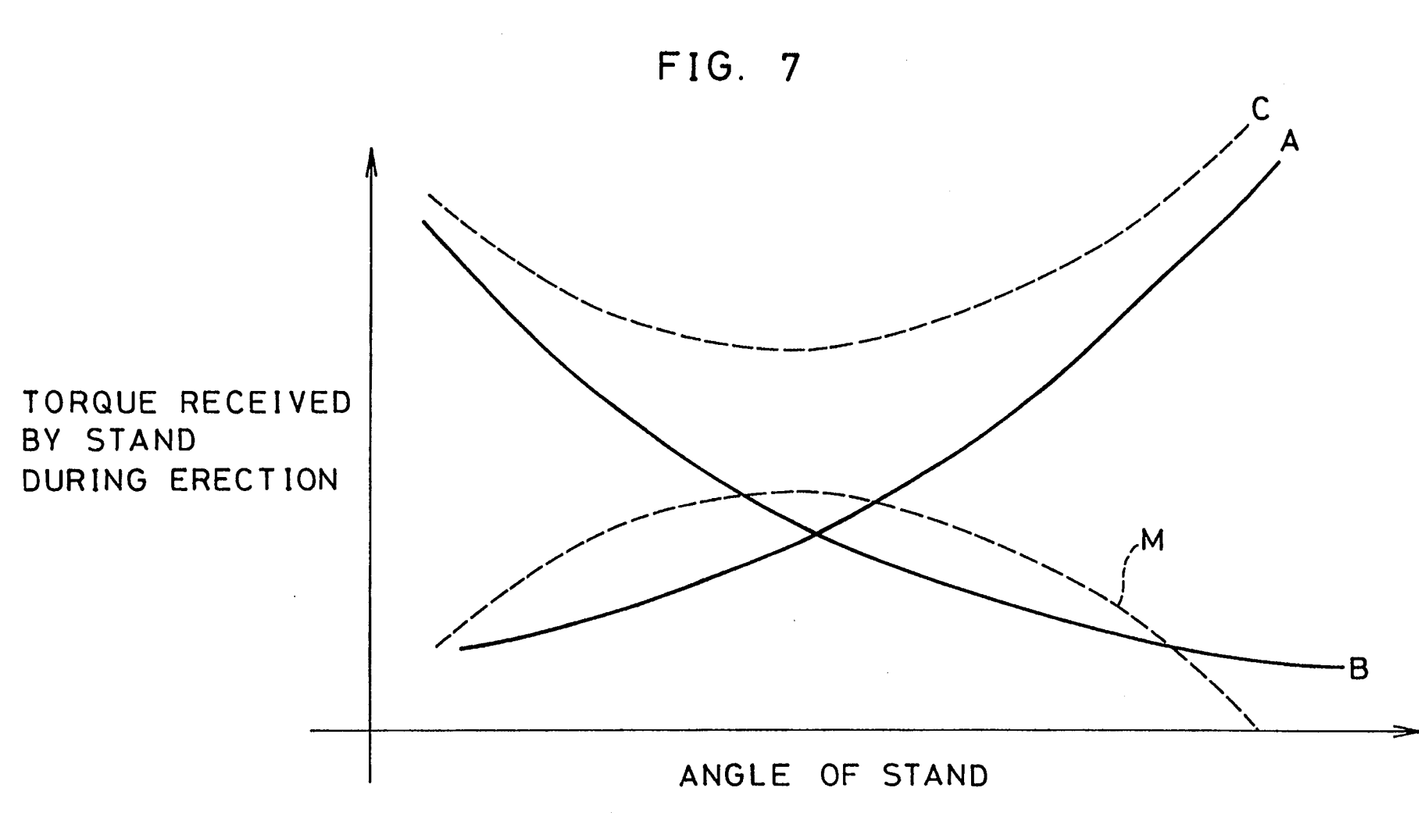
FIG. 7 is a graph illustrating changes in torque applied to the stand relative to an angle of swinging the stand.

FIG. 7 illustrates changes in the biasing force of the gas spring 31 and the coil spring 18 with reference to the upward swinging angle of the stand 2. The solid line A represents the biasing force of the gas spring 31. The solid line B represents the biasing force of the coil spring 18. The stand 2 receives application of force represented by the broken line C and constituted by the sum of the forces of the lines A and B. The broken line M represents the force manually applied by the user.

Figure 6A:
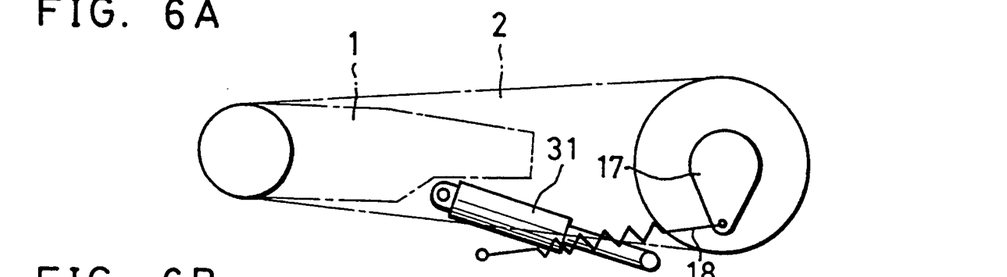
FIGS. 6A to 6C are explanatory views in cross section, illustrating steps of movement of a gas spring and a coil spring while the stand is swung.
Figure 6B:
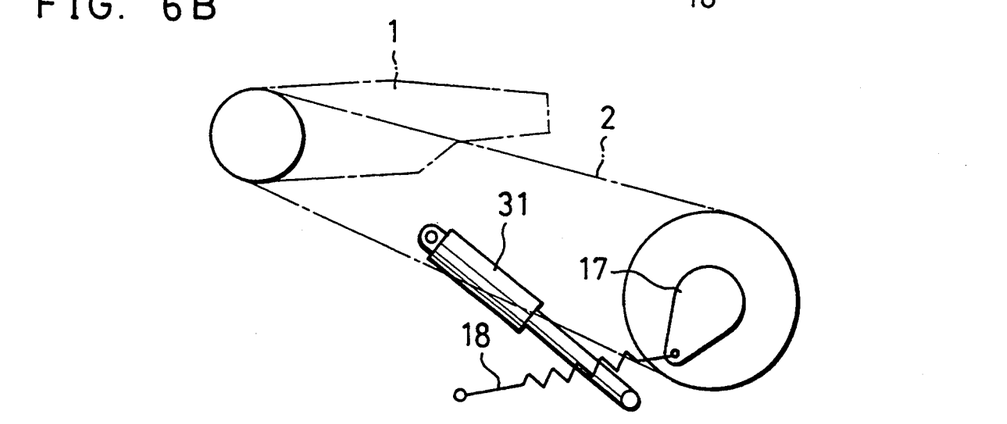
Figure 6C:
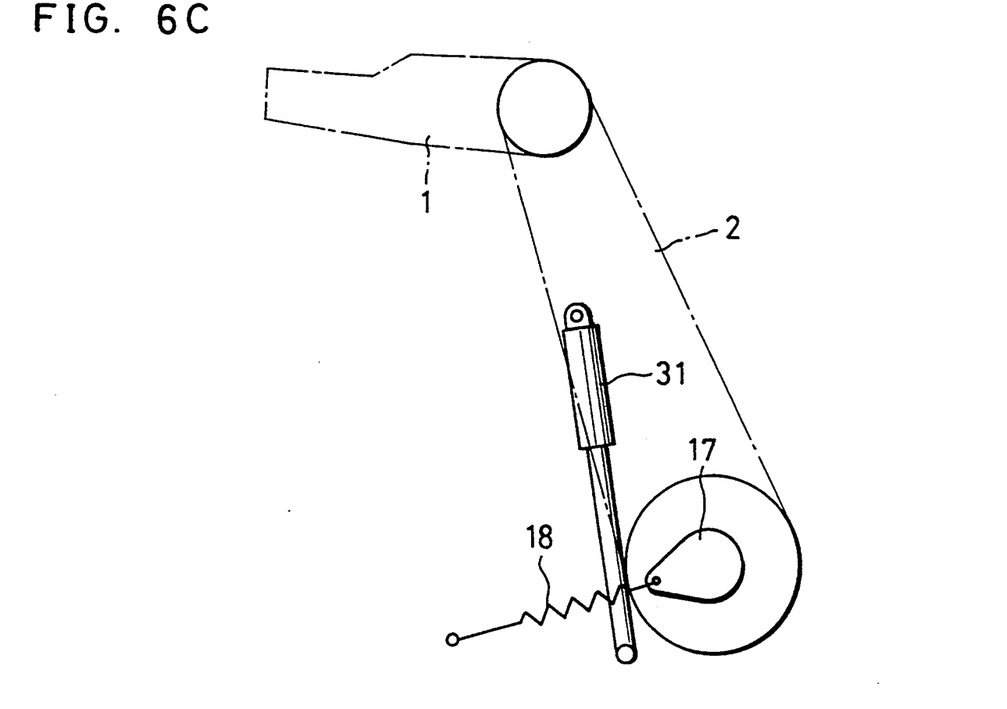

After the rear cover 29 is swung to a predetermined position, the stand 2 is manually grasped, and swung in the erecting direction about the shaft 16 against the gravity applied to the projecting head 1 and the stand 2. As seen in FIG. 6A, the stand 2 is biased upward by the coil spring 18, and can be raised even by the small force M manually applied. In course of the swing of the stand 2, the force B of the coil spring 18 becomes lower in the position of FIG. 6B, where, however, the force A of the gas spring 31 becomes higher. Thus the stand 2 can be further raised by the small force M. When the stand 2 is swung to the fully erected position in FIG. 6C, the force A of the gas spring 31 becomes maximum. The projecting head 1 is stably held in the erected position for the projection without any accidental deviation.

There is no section with an excessively low value of the biasing force C in the swinging range of the stand 2. Accordingly the operation of erecting the stand 2 is smoothed, in view of the convenience to the user operating the overhead projector. Likewise, the folding operation of the stand 2 is smoothed, as the force applied for lowering the stand 2 is distributed the somewhat wider range of swinging.

In course of the rise of the stand 2, the pinion 27 in mesh with the gear 20 is both rotated clockwise in FIG. 2 and revolved about the gear 20. During the rise of the stand 2, the pinion 27 is revolved only through a range below half the periphery around the gear 20. The teeth around the pinion 27 are at most half as many as the teeth around the gear 20, so that the pinion 27 is caused to make one rotation about its axis with the stand 2 raised. The pulley shaft 21b and the pulley 23 are rotated clockwise together.

When the pulley 23 is rotated clockwise, its rotation is transmitted by the wire 25 to the pulley 22, which rotates counterclockwise. The pulley 22 has the pulley shaft 21a fixed on the projecting head 1. Thus the counterclockwise rotation of the pulley 22 swings the projecting head 1 counterclockwise on the stand 2.

As described above, the projecting head 1 is swung in a manner reverse to the swing of the stand 2 while they are being erected together. This is favorable in that the projecting head 1 is prevented from striking the stage 3 in course of swinging the projecting head 1 from the folded position to the erected position. It is possible to utilize the swinging range of the stand 2 for linking the projecting head 1 with the stand 2. It is possible broadly in the swinging range of the stand 2 to distribute the load applied to the projecting head 1 while swung. There is no section with excessive values of such load in the swinging range of the stand 2. The stand 2 is swingable reliably in smooth fashion by the virtue of the gas spring 31 and the coil spring 18.

Figure 8A:
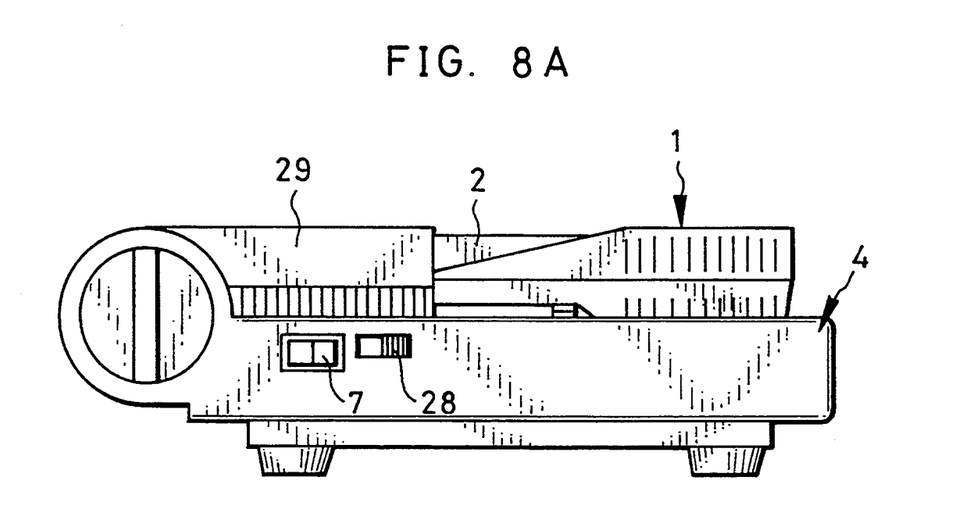
FIGS. 8A and 8B are side elevations illustrating relative positions of the rear cover and the projecting head, respectively when folded and unfolded.
Figure 8B:
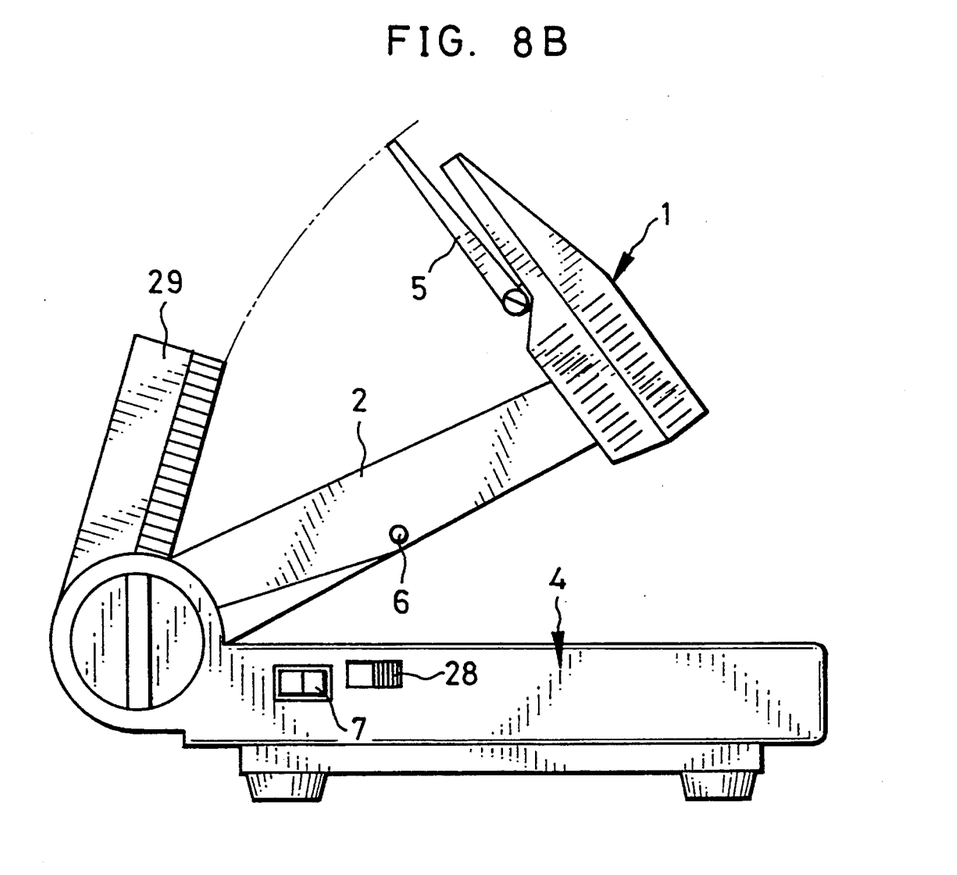

The projecting head 1 swings counterclockwise. Should the rear cover 29 be halfway open and short of a predetermined position, the projecting head 1 would be likely to strike an edge of the rear cover 29. However, the structure in FIG. 3 mechanically swings the rear cover 29 fully to its position, and prevents the rear cover 29 from stopping in a midway position in its orbit. In FIG. 8A, the opener button 28 is operated while the rear cover 29 is closed. Even when the projecting head 1 is moved with the stand 2 swung as illustrated in FIG. 8B, the projecting head 1 never strikes the rear cover 29.

The stand 2, when swung approximately through 80 degrees, is locked in the erected position by a clicking mechanism (not shown). The projecting head 1 is set in the erected position in FIG. 1. The overhead projector stands by for projecting operation. During the rise of the stand 2, the stage 3 is lifted to the usable position. Then the original 10 is set on the stage 3. The projecting mirror 5 is raised away from the mirror stopper 6. The main switch 7 is turned on. Then the image on the original 10 is projected on to a screen.

To collapse the overhead projector, the stand 2 in FIG. 1 is unlocked, and swung down toward the stage 3 against the bias of the gas spring 31 and the coil spring 18. The pinion 27 is revolved along the periphery of the gear 20 in the direction reverse to that in the erecting operation. The revolution of the pinion 27 rotates the pulley 23 counterclockwise, and causes the wire 25 to rotate the pulley 22 clockwise.

The stand 2 is further swung toward the stage 3. The projecting mirror 5 is contacted on the mirror stopper 6, and is swung to be flush with the projecting head 1. The stand 2 is lowered to the folded position and confronts the stage 3. The projecting mirror 5 is completely folded along the projecting head 1, and is kept from damaging a Fresnel face of the stage 3. The stage 3 is sunken to form the containing space, in which the projecting head 1 is contained in the orientation upside down.

In the above, the extension coil spring 18 and the gas spring 31 are used for biasing the stand 2. Instead, other bias devices may be used for the biasing the stand, and can be selected among various types, including torsion coil spring or other metal springs, and rubber members.

Although the present invention is illustrated applied to an overhead projector of the reflection type, it is also applicable to an overhead projector of the transmission type in which the original material to be projected is illuminated by a light source positioned below a transparent Fresnel lens.

The present invention is further applicable to an image input apparatus which incorporates a video camera that picks up an image and supplies video signals of the image for a CRT display, a video tape recorder, or the like.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A foldable optical apparatus comprising:
   a base table having a stage on which an original is placed;
   an image forming head, including at least an optical system, for forming an image of said original placed on said base table;
   a support device, having first and second ends, said first end mounted on said base table, said support device swinging between an erected position and a folded position where said support device is superposed on said stage, said image forming head mounted on said second end in swingable fashion;
   a first bias device, disposed between said support device and said base table, for biasing said support device from said folded position toward said erected position, said first bias device having biasing force decreasing as said support device comes nearer to said erected position; and
   a second bias device, disposed between said support device and said base table, for biasing said support device from said folded position toward said erected position, said second bias device having biasing force increasing as said support device comes nearer to said erected position.

2. A foldable optical apparatus as defined in claim 1, wherein a light source for illuminating said original is contained in said image forming head; and
   said optical system includes a projecting lens for projecting said image on to a screen and a mirror for flexing an optical path of said projecting lens.

3. A foldable optical apparatus as defined in claim 2, wherein said stage has a Fresnel mirror for reflecting light from said light source after passage through said original, to direct said light toward said optical system.

4. A foldable optical apparatus as defined in claim 2, wherein a sum of said biasing forces of said first and second bias devices comes down to a minimum between said erected position and said folded position.

5. A foldable optical apparatus as defined in claim 2, wherein said first bias device is connected beside said first end between said support device and said base table, is pulled to be longer in said folded position, and recovers an originally shorter form in response to an operation of releasing said support device from said folded position.

6. A foldable optical apparatus as defined in claim 5, wherein said second bias device is connected beside said first end between said support device and said base table, is compressed to be shorter in said folded position, and recovers an originally longer form in response to said operation of releasing said support device from said folded position.

7. A foldable optical apparatus as defined in claim 6, wherein said first bias device is an extension coil spring, and said second bias device is a gas spring.

8. A foldable optical apparatus as defined in claim 2, wherein said image forming head moves between an erected position and a folded position where said image forming head is superposed on said stage; further comprising:
   a cover, secured on said base table, for swinging about said first end between an erected position and a folded position where said cover is superposed on said stage, said cover covering at least a portion of said support device and said image forming head; and
   a retainer device for engaging said cover with said base table to retain said cover in said folded position, so as to keep said support device and said image forming head in said folded position.

9. A foldable optical apparatus as defined in claim 8, wherein said cover in said erected position is away from an orbit of moving said image forming head in revolution about said first end and in rotation about said second end.

10. A foldable optical apparatus as defined in claim 9, further comprising:
    a pop-up spring, disposed between said cover and said base table, for biasing said cover toward said erected position from said folded position;
    a wheel fixed on said cover and disposed co-axially therewith; and
    a governor mechanism, disposed on said base table and coupled with said wheel, for lowering a speed of said cover swung by said pop-up spring.

11. A foldable optical apparatus as defined in claim 10, further comprising an externally operable opener button, associated with said retainer device, and operated for releasing said retainer device to disengage said cover from said base table, so as to allow said support device and said image forming head to swing to said erected position.

12. A foldable optical apparatus as defined in claim 2, wherein said image forming head moves between an erected position and a folded position where said image forming head is superposed on said stage;
    further comprising a transmission device, disposed on said support device, for transmitting swing to said image forming head in response to swing of said support device relative to said base table, to swing said image forming head relative to said support device.

13. A foldable optical apparatus as defined in claim 12, wherein said transmission device swings said image forming head relative to said support device in a direction reverse to said swing of said support device relative to said base table; and
    said image forming head in said folded position is superposed on said stage with said support device.

14. A foldable optical apparatus as defined in claim 13, wherein said transmission device includes:
    a first pulley, associated with said first end, for rotating with said support device;
    a second pulley, disposed on said second end, for rotating with said image forming head; and
    a wire member, connected about said first and second pulleys in crossed fashion, for transmitting rotation of said first pulley to said second pulley, said second pulley rotated in reverse to said first pulley.

15. A foldable optical apparatus as defined in claim 14, wherein said second pulley is fixed on said image forming head.

16. A foldable optical apparatus as defined in claim 15, wherein said transmission device further comprising:
    a gear disposed in stationary fashion relative to said base table and co-axially with said first end; and
    a pinion, disposed beside said first end, rotatable co-axially with said first pulley, and engaged with said gear, for revolving about said gear in response to said swing of said support device, to rotate said first pulley.

17. A foldable optical apparatus as defined in claim 16, wherein said pinion has teeth at most half as many as teeth about said gear.

* * * * *